United States Patent [19]

Swanholm et al.

[11] 4,038,227

[45] July 26, 1977

[54] PHOTODEGRADABLE POLYOLEFINS CONTAINING AN AROMATIC KETONE, FERRIC STEARATE, AND A PIGMENT

[75] Inventors: Carl E. Swanholm; Robert G. Caldwell, both of Boise, Idaho

[73] Assignee: Bio-Degradable Plastics, Inc., Sioux Falls, S. Dak.

[21] Appl. No.: 722,744

[22] Filed: Sept. 13, 1976

Related U.S. Application Data

[60] Continuation of Ser. No. 538,390, Jan. 3, 1975, abandoned, which is a division of Ser. No. 372,046, June 21, 1973, Pat. No. 3,888,804, which is a continuation-in-part of Ser. No. 195,021, Nov. 2, 1971, abandoned.

[51] Int. Cl.$^2$ .................................................. C08J 3/20
[52] U.S. Cl. ............................. 260/23 H; 260/42.46; 260/DIG. 43; 526/1; 526/5; 526/21
[58] Field of Search ................... 260/DIG. 43, 42.46, 260/23 H; 526/5, 1, 21

[56] References Cited

U.S. PATENT DOCUMENTS

| | | | |
|---|---|---|---|
| 3,474,001 | 10/1969 | Leavitt | 195/28 R |
| 3,767,638 | 10/1973 | Johnson | 260/DIG. 43 |
| 3,769,164 | 10/1973 | Azarowicz | 195/28 R |
| 3,825,626 | 7/1974 | McGaugh et al. | 260/DIG. 43 |
| 3,830,764 | 8/1974 | Hudgin et al. | 260/DIG. 43 |
| 3,846,395 | 11/1974 | Harper et al. | 260/DIG. 43 |

OTHER PUBLICATIONS

C & E News, p. 61, May 11, 1970.

*Primary Examiner*—Eugene C. Rzucidlo

[57] ABSTRACT

Photodegradable hydrocarbon polymers that are susceptible to attack by common microorganisms after exposure to sunlight in a natural atmospheric environment. The polymers include polystyrene and polyethylene polymers and copolymers modified with one or more chemical additives to initiate and to enhance photodegradation.

9 Claims, No Drawings

PHOTODEGRADABLE POLYOLEFINS CONTAINING AN AROMATIC KETONE, FERRIC STEARATE, AND A PIGMENT

This is a continuation of application Ser. No. 538,390 filed Jan. 3, 1975, now abandoned which in turn is a division of application Ser. No. 372,046, filed June 21, 1973, now U.S. Pat. No. 3,888,804 which is a continuation-in-part of copending application Ser. No. 195,021, filed Nov. 2, 1971, now abandoned, on Photodegradable Hydrocarbon Polymers, and Method of Producing Same.

This invention relates generally to improvements in the use of chemical additives for plastic products to enhance their degradation when exposed to sunlight in the natural environment, and more particularly to hydrocarbon polymer packaging and other products that normally possess relatively strong structural characteristics but that readily decompose when exposed to radiation within the ultraviolet content of sunlight and are susceptible, after initiation of the decomposing process, to attack by common microorganisms existing in the outdoor environment, thereby leading to biodegradation of the product.

The collection and disposal of packaging and other products formed from synthetic plastic materials are a major problem which contribute to the litter common to man's environment. As evidenced by the British Pat. No. 1,128,793, it has been proposed in the prior art to provide synthetic plastic materials that will disintegrate upon exposure to ultraviolet light or sunlight. In that reference, the packaging material consists of a copolymer of ethylene and carbon monoxide, the carbon monoxide being present in an amount which will permit the packaging material to disintegrate following exposure to natural sunlight. Furthermore, it is known in the prior art (as evidenced by the U.S. Pat. No. 2,484,529, Steck U.S. Pat. No. 2,986,507, Neugebauer U.S. Pat. No. 2,989,455 and Potts U.S. Pat. No. 3,219,566 and the article by Gerald Oster et al., *Journal of Polymer Science,* Volume 34 (1959), page 67) that photosenitizers, such as benzophenone, anthraquinone and anthrone, may be used to promote crosslinking and insolubilizing of polymers upon ultraviolet irradiation. Concomitant with such crosslinking and insolubilization, a certain amount of photo-oxidative scission of polymer chains is to be expected.

The primary object of the present invention is to reduce the problem of litter synthetic plastic products by incorporating in the product a suitable photosensitizer that produces a photo-oxidative chain scission of the polymer to afford a degraded polymeric product. In accordance, with an important advantage of the invention, the irradiation of such products in the natural environment leads to disintegration and subsequent microbial attack of the plastic products, thereby alleviating the litter problem.

This invention is particularly applicable to hydrocarbon polymers and copolymers made from unsaturated monomers using at least 20 percent of the structural unit of general formula

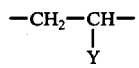

wherein Y represents hydrogen or a phenyl group. Useful styrene-containing polymers include styrene homopolymer, homopolymers of styrene derivatives such as α-methylstyrene, high impact polystyrene, copolymers such as styrene-α-methylstyrene copolymer or copolymers of styrene or styrene derivatives with another monomer copolymerizable with it, e.g. styrene-butadiene copolymer, acrylonitrile-butadiene-styrene copolymer, etc. Useful polyolefins include high and low density polyethylene.

Materials that have been used for crosslinking or insolubilizing polymeric materials have been found to accelerate their decomposition in the presence of sunlight and air. In Table I are shown examples of several photosensitizing aromatic carbonyl compounds that have been examined for their effect on increased rate of decomposition of polystyrene foam products.

TABLE I

THE EFFECT OF IRRADIATION BY SUNLIGHT ON POLYSTYRENE FOAM/PHOTOSENSITIZER SYSTEMS

| Additive | Conditions after Exposure to Sunlight |
|---|---|
| Benzophenone | Extreme Degradation |
| Anthrone | Extreme Degradation |
| Anthraquinone | Extreme Degradation |
| Control | No Visible Change |

40,000 langleys (gram calories per $cm^2$ of incident radiation)

Quanties of photosensitizer in the final product may be, but would not usually be used in excess of 10%; preferably the weight of the photosensitizer relative to the weight of the polymer, is in the range of 0.1% to 3%. The photosensitizers may be added to polymers which already have been polymerized or may be added to the monomers before polymerization.

Benzophenone can be made more effective in promoting degradation of polystyrene by the use of certain phenols, especially hindered phenols, as co-additives. For example, an especially effective phenol, 2,6-di-t-butyl-4-methyl phenol (BHT), widely used as an antioxidant in polymers, when used in the ratio of 1-3 parts BHT to 3 parts by weight of benzophenone allows a one-third reduction in the amount of benzophenone needed to produce the same effectiveness in polystyrene. This particular combination is especially useful in food packaging applications since both components are approved for use in direct contact with foods. The BHT in this system appears to function initially as an anti-oxidant thereby delaying the on-set of photo-oxidation until consumed, which affords a long, safe shelf-life, preventing premature loss in physical properties of the package. After this indication period, increased activity over that expected from benzophenone itself is ascribed to the conversion of the phenol to species which are themselves photo-active. The net effect is a build-up of latent photo-active species while suppressing photo-oxidation until the phenol is consumed at which time photo-oxidation proceeds at an enhanced rate due to the large concentration of photo-active species.

Certain substituted benzophenones and anthraquinones are also effective in promoting the photo-degradation of polyethylene and polystyrene and possess better physical properties and solubilities than the parent compounds for some applications. For example, the alkylated benzophenones are especially suited for thin-film polyethylene applications due to their lower migration tendencies compared to benzophenone itself. Migration tendencies may be determined by measuring the disappearance of the absorbances of the carbonyl group in the infra-red spectrum of the films with time at room temperature. The degradation rates upon exposure to sunlight are proportional to the ketone remaining in the film. Useful packaging films cannot be made with ketones that migrate significantly. Practical packaging films must maintain their latent activity for periods up to six months or even a year depending upon the application. Photosensitizers that meet these requirements include 4,4'-di-t-butylbenzophenone, 4-t-butylbenzophenone, 4-dodecylbenzophenone, and 2-t-butylanthraquinone.

Certain aromatic aldehydes also are effective. Vanillin (4-hydroxy-3-methoxybenzaldehyde) is especially effective in promoting loss in physical properties of high-impact polystyrene when exposed to sunlight while remaining inert for long periods under indoor lighting. This insures an acceptable shelf-life for packaging products for which vanillin as an additive is especially suitable due to its acceptability as a direct food additive.

The photosensitizers behave somewhat differently in polyethylene than they do in polystyrene. An initial toughening occurs when polyethylene film containing photosensitizers is irradiated. Systems containing both a photosensitizer and a transition metal salt are most effective for promoting photodegradation of polyolefins. Photodegradation of polyethylene can be greatly accelerated by incorporating into such polymers from 0.5 to 0.5 percent by weight, based on the polymer, of a photosensitizer in combination with a transition metal salt, such as manganese or iron stearate, present at 0.05 to 1.0 percent by weight.

Moreover, inclusion of certain colored pigments in polyethylene enhances the photodegradation of polyethylene when photosensitizers are present. This is contrary to the usual observation that pigments screen impinging light and afford protection from degradation caused by light. A combination photosensitizer-transition metal salt system in colored polyethylene results in practical photodegradable products.

The chemical additives contemplated in this invention therefore are photosensitizing agents selected from the group of compounds represented by the general formulas

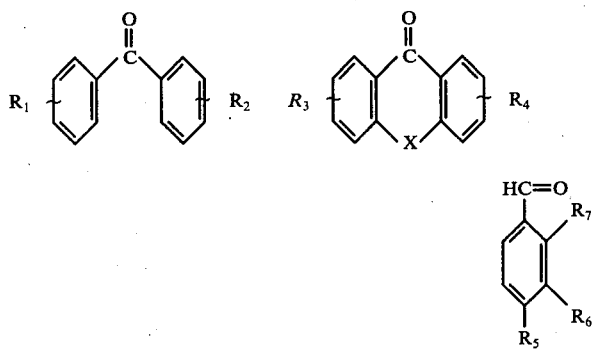

wherein $R_1$, $R_2$, $R_3$, and $R_4$ represent hydrogen, halogen, or alkyl or alkoxyl groups; $R_5$ and $R_6$ represent hydrogen, or hydroxyl or alkoxyl or alkyl groups; $R_7$ represents hydrogen, halogen or an alkyl or an alkoxyl group; and X represents a carbonyl group or a $CHR_8$ group where $R_8$ is hydrogen or an alkyl or akoxyl group. Co-additives comprising, for example, a transition metal salt may be used advantageously for some applications.

It has been found that the average molecular weight of polystyrene decreases significantly after irradiation in the presence of photosensitizers. This has been measured by following the change in viscosity of solutions of the polymeric materials with time after irradiation in an Atlas Carbon Arc Weather-O-Meter. After exposure for five hours in the Weather-O-Meter, the viscosity of a 2% W/V solution of the polymeric material in benzene at 25° C. was found to fall from 2.85 centistokes to 1.50 centistokes for samples of polystyrene foam containing originally 4.2% benzophenone and fell from 2.58 centistokes to 1.62 centistokes for a polystyrene foam sample originally containing 2.6% anthrone. This can be compared to a change in the viscosity of a solution made from a polystyrene control sample without additive irradiated for the same time whose viscosity fell only from 2.63 centistokes to 2.52 centistokes. Further irradiation of samples containing the additives mentioned above led to further decreases in the viscosity of the solutions. The viscosity decrease found after irradiation of the photosensitized polystyrene is well known to correspond to a decrease in molecular size. The degradation of the polymeric material after irradiation is revealed by the viscosity decrease of its solutions.

Viscosity measurements also show a rapid decrease in the average molecular weight of low density polyethylene upon irradiation in the presence of photosensitizers as is illustrated in Example 19.

Polystyrene and polyethylene samples containing additives exhibited a large increase in the absorption of infrared radiation corresponding to carbonyl and hydroxyl groups formed in oxidative scission.

The polystyrene samples containing additives turned color after irradiation which was confirmed by an increase in absorption of light in the ultraviolet visible region measured on an ultraviolet-visible spectrometer. Corresponding control samples without additives exhibited only slight increases in ultraviolet-visible light absorption after irradiation and measured in the same manner. These data support the conclusion that oxygen has been chemically incorporated into the degraded polymer. The incorporation of oxygen was substantiated by elemental analyses for carbon, hydrogen and direct oxygen. Analysis of a first portion of the foam product containing 2.6% of anthrone (that was not exposed to sunlight) yielded 91.50% carbon, 7.59% hydrogen, and 1.22% oxygen, whereas a second portion of the foam product, after exposure to sunlight for a period of three weeks yielded 88.73% carbon, 7.39% hydrogen and 3.89% oxygen.

Oxidative scission of polystyrene molecules leads to smaller molecular chains with oxidized end groups which would be more prone to microbial attack than the precursor polymers. It has been established that at least three commonly occurring microorganisms, namely *Aspergillis niger, Chaetomium globosum,* and *Penicillium sp.* do in fact, biodegrade polystyrene foam samples with benzophenone added as photosensitizer after the samples have been exposed to sunlight in contrast to similar samples with and without additives but which have not been exposed to sunlight.

The following examples are illustrative of the present invention.

EXAMPLE 1

Polystyrene foam products that exhibit greatly enhanced photodegradability have been prepared using readily available conventional equipment. A standard screw-type extruder for the thermoplastics was employed using general purpose polystyrene pellets precharged with 5% pentane as a blowing agent with 0.3% citric acid and 0.35% sodium bicarbonate present as nucleating agents. A 25 lb. charge was prepared using one pound of benzophenone which was physically mixed with the polystyrene pellets at ambient temperatures in a revolving drum before addition to the extruder hopper. The pre-mix material was extruded at about 400° F. in the form of polystyrene foam sheet which was handled conventionally and subsequently thermoformed, using conventional techniques, into meat trays for testing. The resulting product which, as a consequence of losses sustained during the extrusion process, has an actual final concentration of benzophenone, by weight of 2.6% was exposed to sunlight in the outdoor environment and was found to possess much greater photodegradability than control meat trays that did not contain photosensitizer.

EXAMPLE 2

A standard 20:1 L/D, 2½ inch extruder was charged with 100 lbs. of general purpose polystyrene beads precharged with 5% pentane containing 2 lbs. of benzophenone mixed in with 0.3% citric acid and 0.3% sodium bicarbonate as nucleating agents. The pre-mixed material as extruded at about 400° F into foam which was thermoformed, using conventional techniques, into 12 inch × 20 inch apple trays of about ⅛ inch thickness. The resulting product analyzed 1.8–2.0% benzophenone by infrared analysis (IR).

Samples of the above trays along with control trays without benzophenone were exposed to the sun at 45° S in Phoenix during April-August and received a total of 19,200 langleys of radiation. The samples containing benzophenone turned light yellow and were very friable and broken. The control trays were essentially unchanged in color and physical properties. IR analyses of films cast from chloroform of the benzophenone-containing samples showed no carbonyl absorption at 1660 $cm^{-1}$ or 1275 $cm^{-1}$ due to benzophenone. New intense broad bands were observed at 3400 $cm^{-1}$ (hydroxyl) and 1720 $cm^{-1}$ (carbonyl), which were far more intense than in the control trays.

The degraded foam, the exposed control foam and the unexposed benzophenone-containing foam, where examined for toxicity in rats using standard feeding experiments over 28 days. The results indicated no toxicity or adverse effects from any of the three.

The degraded foam was subjected to gel permeation chromatography in order to determine the extent of molecular degradation of the sensitized foam.

TABLE II

|  | Wt. Ave. Mol. Wt. | Mol. Wt. Dispersion |
|---|---|---|
| Control Foam | 303,000 | 5.69 |
| Foam Containing Benzophenone | 84,500 | 10.95 |

Table II shows the dramatic reduction in the average molecular weight and the molecular weight distribution. This evidence supports the fact that chain scission greatly predominates over cross-linking. It is also observed from the molecular weight distribution curves that over 20% of the degraded polystyrene contains species of molecular weights below 4,000 while the control polystyrene contains less than 2% below molecular weight 4,000. It has been shown by others that high molecular weight is one factor preventing bio-degradation of polystyrene.

Certain fungi and bacteria were able to utilize the photodegraded fragments from benzophenone-containing polystyrene foam utilizing ASTM methods G-21-70 and G-22-67T which are qualitative in nature. Certain micro-organisms also can assimilate the photodecomposition products as the sole carbon source, whereas the unexposed materials are not assimilated.

This was established using an adaptation of the plate count technique which consisted of placing finely-pulverized and sterile foam samples in a growth medium containing all nutrients for growth except carbon. Aliquots were withdrawn at intervals and the number of micro-organisms determined by serial dilution techniques. In this way, the growth curves could be plotted and the rates compared to positive controls (citrate present) and negative controls (mineral salts only). The technique was especially useful for bacteria where the bacterial colonies were difficult to observe directly. Two bacteria, *Streptomyces albus* and *Bacilus subtilus* and two fungi, *Aspergillus niger* and *Penicillium funiculosum*, adapted readily to the exposed foam but not to the unexposed foam as shown in Table III.

TABLE III

| UTILIZATION OF FOAM AS METABOLIC CARBON SOURCES | | | | | | |
|---|---|---|---|---|---|---|
| | FUNGI | | | | | |
| | Aspergillus niger | | | Pericillium funiculosum | | |
| Media | 0 | 14 | 28 days | 0 | 14 | 28 days |
| Mineral Salts | $1.0 \times 10^5$ | $2.2 \times 10^5$ | $2.1 \times 10^5$ | <100 | $6 \times 10^2$ | $8 \times 10^2$ |
| Mineral Salts plus sodium citrate | $2.2 \times 10^5$ | $2.5 \times 10^5$ | $5 \times 10^6$ | <100 | $2 \times 10^3$ | $2 \times 10^5$ |
| Mineral Salts plus control foam | $2.5 \times 10^5$ | $1.8 \times 10^5$ | $3.2 \times 10^5$ | <100 | $2 \times 10^3$ | $4 \times 10^3$ |
| Mineral Salts plus benzophenone-foam, unexposed | $2.0 \times 10^5$ | $1.8 \times 10^5$ | $2.4 \times 10^5$ | <100 | $2 \times 10^3$ | $4 \times 10^3$ |
| Mineral Salts plus benzophenone-foam, exposed | $3.6 \times 10^5$ | $2.5 \times 10^5$ | $5.0 \times 10^6$ | <100 | $1.2 \times 10^4$ | $2 \times 10^4$ |
| | BACTERIA | | | | | |
| | Bacillus subtillus | | | Streptomyces albus | | |
| Media | 0 | 72 | 168 hrs. | 0 | 72 | 168 hrs. |
| Mineral Salts | $1.8 \times 10^3$ | $1.1 \times 10^4$ | $1.1 \times 10^4$ | $3.0 \times 10^2$ | $5.0 \times 10^2$ | $5.3 \times 10^2$ |
| Mineral Salts plus sodium citrate | $1.9 \times 10^3$ | $5.9 \times 10^6$ | $1.6 \times 10^8$ | $1.4 \times 10^2$ | $4.2 \times 10^4$ | $1.2 \times 10^4$ |

TABLE III-continued

| UTILIZATION OF FOAM AS METABOLIC CARBON SOURCES | | | | | | |
|---|---|---|---|---|---|---|
| Mineral Salts plus control foam | $1.5 \times 10^3$ | $8.1 \times 10^3$ | $8.0 \times 10^3$ | $<100$ | $6.5 \times 10^2$ | $1.2 \times 10^3$ |
| Mineral Salts plus benzophenone-foam, unexposed | $1.8 \times 10^3$ | $8.0 \times 10^3$ | $8.6 \times 10^4$ | $1.5 \times 10^2$ | $8.5 \times 10^2$ | $1.3 \times 10^3$ |
| Mineral Salts plus benzophenone-foam, exposed | $1.7 \times 10^3$ | $8.9 \times 10^4$ | $3.0 \times 10^5$ | $<100$ | $9.7 \times 10^2$ | $5.0 \times 10^3$ |

Additional microbiological studies were conducted using microorganism colonies actually found in the environment. For example, bottom sludge waste from a stagnant pond was utilized as a biiologically active source to determine if the biological activity changed upon addition of photodegraded polystyrene foam containing benzophenone as a photosensitizer. A sharp decrease in the dissolved oxygen in the water was noted upon addition of such a sample, indicating increased biological activity and, therefore, utilization of the degraded material by the micro-organisms.

EXAMPLE 3

Polystyrene was produced by a suspension polymerization method described in U.S. Pat. No. 2,888,410 with 1.75% benzophenone by weight based on styrene monomer added to the charge. The granular polystyrene containings benzophenone was then made into foamable beads by charging with pentane in a method described in U.S. Pat. No. 3,086,885. The dried beads were sized by screening and the beads of 30/35 mesh containing 2.0% by weight benzophenone by IR analysis molded into 7 oz. foamed cups on production equipment using a method described in U.S. Pat. No. 2,744,291.

The foamed cups containing the benzophenone were exposed in an Atlas sunshine carbon are weather-o-meter. Samples were removed at intervals. Weighed amounts of sample were dissolved in chloroform, films cast on teflon and the chloroform evaporated by forced air. Films of 10 mm. thickness were subjected to a puncture test after recording their IR transmission spectra directly. The carbonyl absorption band of benzophenone at 1660 cm$^{-1}$ had disappeared after 25 hours exposure with new broad bands increasing with exposure time near 3400 cm$^{-1}$ (hydroxyl) and 1720 cm$^{-1}$ (carbonyl), both at a faster rate than the control sample. The enhanced brittleness over control can be seen from Table IV. After 200 hours the benzophenone-containing cups were so fragile that they could not be handled without disintegration. Samples were removed at intervals of 25, 100 and 200 hours. 3 mil films were cast from chloroform and their IR spectra and puncture strength determined.

Puncture strength of the films was measured by recording the load necessary for a probe having a rounded point of approximately 1mm in diameter and driven at a constant speed of 8 cm/min. to completely puncture the film. The film was mounted in a gasketed frame on the pan of a toploading balance, and the load at puncture read directly from the balance scale. The results were recorded as the fractional puncture strength relative to the puncture strength of the same unexposed film. The more degraded the film material the easier it was to puncture, and the lower the puncture index.

TABLE IV

WEATHER-O-METER EXPOSURE- POLYSTYRENE FOAM CUPS

| | % Puncture Strength Retention | | |
|---|---|---|---|
| | 25 hrs. | 100 hrs. | 200 hrs. |
| Film from Foamed Cup containing benzophenone | 20 | 10 | — |
| Film from Foamed Cup Control | 60 | 40 | 15 |

Actual outdoor exposures in several locations paralleled the accelerated exposure tests and confirmed degradation enhancement.

EXAMPLE 4

A 25 lb. batch of general purpose polystyrene was pre-mixed in a revolving drum with 1.25 lbs. of benzophenone and placed in a standard screw-type extruder as described above. The material containing approximately 5% benzophenone by weight was extruded at 400° F. through a multiple-strand die and the extrudate cooled and pelletized using conventional equipment and the concentrate stored in the dark for future processing.

EXAMPLE 5

The polystyrene concentrate prepared as described in Example 4 was then mixed with virgin general purpose polystyrene in the ratio of 1 part concentrate to 5 parts polystyrene and added to the extruder hopper. About 5% pentane was injected directly into the dual extruder as a blowing agent along with 0.3% citric acid and 0.35% sodium bicarbonate as nucleating agents and the foam extruded at about 400° F. The resulting product which consisted of polystyrene foam sheet containing approximately 1% benzophenone was thermoformed as before into meat trays for testing purposes. The resulting meat trays were exposed to sunlight in the outdoor environment and were found to possess much greater photodegradability than control meat trays not containing photosensitizers.

EXAMPLE 6

The polystyrene pellets containing approximately 5% benzophenone prepaared as described in Example 4 were mixed at ambient temperatures with virgin general purpose polystyrene pellets to yield a system containing approximately 2% benzophenone by weight. This mixture was added to an extruder as described previously and the extrudate thermoformed into lids for disposable containers in a procss described in Modern Plastics, August, 1971, page 56. The lids formed in this manner containing benzophenone as a photo photosensitizer were exposed to sunlight outdoors and found to become much more brittle and subject to breakage and, hence, disintegration, than the control lids containing no photosensitizers but exposed to the sunlight similarly.

EXAMPLE 7

Various concentrations of bezophenone with butylated hydroxy toluene (BHT) as a co-additive were incorporated in high-impact polystyrene by extrusion and pelletizing. The polymers were extruded into approximately 10 mil sheet and exposed in an Alas Sunshine carbon-arc weather-o-meter. Actual concentration of benzophenone and BHT in the sheets were determined by gas light chromatography. Samples were removed at intervals, 3 mil films cast from chloroform and their IR transmission spectra and puncture strengths recorded.

Table V illustrates the change in infrared spectra with time of exposure for samples exposed 35, 53, 122 and 193 hours in the Weather-o-meter. The table tabulates a so-called "hydroxyl index" which is the ratio of the hydroxyl absorption at 3400 cm$^{-1}$ that corresponds to hydroxyl containing products of photo-oxidative degradation to the absorption at 1860$^{-1}$ cm for polystyrene corrected to time 0. It also tabulates a "carbonyl index" which is the ratio of the 1720 cm$^{-1}$ carbonyl absorption corresponding to the carbonyl containing products of photo-oxidative degradation to the 1860 cm$^{-1}$ polystyrene absorption corrected to time 0. Increase in these ratios is indicative of greater photo-oxidative degradation. In addition, Table V tabulates the disappearance of the rubber double bond in the impact polystyrene over the same time intervals at 960 cm$^{-1}$. The values in Table V are the difference in the ratio of absorbances at 960 cm$^{-1}$ to 1860 cm$^{-1}$ at time 0 and that ratio measured at 35, 55 and 122 hours.

EXAMPLE 8

Benzophenone, p-tert.-butylbenzophenone and p,p'-ditert.-butylbenzophenone were incorporated into high-impact polystyrene by extrusion and pelletizing. Films of 10 mil thickness were extruded containing the desired level of photosensitizer by appropriate dilution, while 3 mil films were prepared directly from the polymer mixture by casting from chloroform as described in Example 3. The various films were exposed in an Atlas Sunshine Weather-O-Meter, and their IR transmission spectra recorded periodically.

The effect of concentration and thickness on hydroxyl and carbonyl production is shown in Table VI at 50, 100 amd 150 and 200 hours' exposure for the "carbonyl index" and "hydroxyl index" as defined in Example 7.

TABLE VI

| Substituted Benzophenone | Concentration m.mol./kg. | Thickness mils | Carbonyl Formation-1720 cm$^{-1}$ 50 | 100 | 150 | 200 | Hydroxyl Formation-3400 cm$^{-1}$ 50 | 100 | 150 | 200 |
|---|---|---|---|---|---|---|---|---|---|---|
| Control | — | 3 | 3.7 | 5.5 | 5.8 | 6.0 | 1.7 | 1.6 | 1.8 | 1.9 |
| p-tert-butyl-benzophenone | 66 | 3 | 5.7 | 6.8 | 7.4 | 8.0 | 1.8 | 1.7 | 1.9 | 2.1 |
| p,p$^1$-ditert.butyl-benzophenone | 66 | 3 | 5.8 | 6.7 | 7.6 | 8.5 | 2.0 | 1.7 | 2.0 | 2.3 |
| p,p$^1$-ditert.butyl-benzophenone | 3.3 | 3 | 4.1 | 5.7 | 5.7 | 5.8 | 2.0 | 1.9 | 1.9 | 2.0 |
| Benzophenone | 3.3 | 3 | 4.6 | 5.6 | 5.8 | 5.8 | 1.9 | 1.7 | 1.8 | 1.9 |
| Control | — | 10 | 1.8 | 2.7 | 3.6 | 4.3 | 0.8 | 1.1 | 1.3 | 1.5 |
| Benzophenone | 66 | 10 | 2.0 | 3.2 | 4.5 | 5.9 | 0.9 | 1.3 | 1.6 | 2.0 |

EXAMPLE 9

Cup lids of high-impact polystyrene were produced as described in Example 6 except that 1.75% of anthrone was substituted for benzophenone. The lids were very light yellow, but otherwise differed little from unmodified high-impact polystyrene. IR analysis indicated that 1.6–2.0% of anthrone was present in the lids by random sampling. The lids of approximately 10 mil thickness were exposed along with unmodified control lids in a sunlamp chamber. Samples were removed at intervals, films of 3–4 mm thickness cast from chloroform and IR spectra (hydroxyl and carbonyl indices as in Example 7) and puncture strengths (as in Example 3)

TABLE V
WEATHER EXPOSURE

| Benzophenone Concentration % | Butylated Hydroxytoluene Conc. % | Hydroxyl Index - 3400 cm$^{-1}$ 35 hr. | 53 hr. | 122 hr. | 193 hr. | Carbonyl Index - 1720 cm$^{-1}$ 35 hr. | 53 hr. | 122 hr. | 193 hr. | Double Bond Disappearance Index - 960 cm$^{-1}$ 35 hr. | 53 hr. | 122 hr. | 193 hr. | Hrs. to Failure |
|---|---|---|---|---|---|---|---|---|---|---|---|---|---|---|
| 0 | 0.08 | 0.66 | 0.82 | 1.2 | 1.5 | 1.5 | 1.8 | 3.1 | 4.2 | −1.3 | −1.4 | −2.4 | — | 320 |
| 0 | 0.20 | 0.61 | 0.78 | 1.3 | 1.6 | 1.4 | 1.6 | 3.4 | 4.5 | −1.2 | −1.3 | −2.1 | — | 340 |
| 0 | 0.43 | 0.42 | 0.66 | 1.0 | 1.5 | 0.9 | 1.3 | 2.6 | 3.7 | −1.1 | −1.3 | −2.0 | — | 375 |
| 0.39 | 0.21 | 0.86 | 1.1 | 1.9 | 2.1 | 1.8 | 2.4 | 4.6 | 6.0 | −1.5 | −1.7 | −2.3 | — | 133 |
| 0.41 | 0.30 | 0.76 | 1.0 | 1.4 | 1.8 | 1.5 | 2.2 | 3.9 | 5.0 | −1.2 | −1.2 | −1.9 | — | 163 |
| 0.70 | 0.32 | 0.75 | 0.97 | 1.5 | 1.9 | 1.5 | 2.1 | 3.7 | 5.7 | −1.4 | −1.4 | −2.0 | — | 147 |
| 0.63 | 0.61 | 0.75 | 0.96 | 1.3 | 1.9 | 1.6 | 2.2 | 3.6 | 5.1 | −1.1 | −1.1 | −1.7 | — | 125 |
| 0.88 | 0.39 | 0.64 | 0.87 | 1.0 | 1.2 | 1.3 | 1.8 | 2.7 | 3.2 | −1.1 | −1.2 | −1.4 | — | 193 |
| 0.85 | 0.60 | 0.77 | 0.99 | 1.4 | 1.8 | 1.4 | 2.2 | 3.8 | 4.9 | −1.4 | −1.4 | −1.9 | — | 132 | determined, as shown in Table VII.

TABLE VII

| High-Impact Polystyrene | Sun Lamp Exposure Hours | Hydroxyl Absorption Index | Carbonyl Absorption Index | Puncture Strength Retention, % |
|---|---|---|---|---|
| No Additive | 0 | — | — | 100 |
| Anthrone | 0 | — | — | 100 |
| No Additive | 1.5 | 0 | 0 | 70 |
| Anthrone | 1.5 | 0 | 0 | 67 |
| No Additive | 5 | 0 | 0.1 | 52 |

TABLE VII-continued

| High-Impact Polystyrene | Sun Lamp Exposure Hours | Hydroxyl Absorption Index | Carbonyl Absorption Index | Puncture Strength Retention, % |
|---|---|---|---|---|
| Anthrone | 5 | 0.1 | 0.3 | 19 |
| No Additive | 24 | 0.3 | 0.7 | 33 |
| Anthrone | 24 | 0.5 | 1.1 | 3 |
| No Additive | 243 | 1.6 | 5.2 | 3 |
| Anthrone | 243 | 2.0 | 5.2 | — |

The anthrone cused greater carbonyl and hydroxyl production in the polystyrene over that of the control up to 24 hours' exposure, which was also reflected in the greater loss in puncture strengths. Under extreme exposure (243 hours), however, the large carbonyl and hydroxyl absorptions were nearly the same in both samples, but a dramatic difference in strength was apparent which is not reflected in the puncture strength. The sensitized polystyrene was completely disintegrated while the control, although brittle, had substantial integrity.

EXAMPLE 10

Vanillin was incorporated into high-impact plystyrene which was extruded and thermoformed as in Example 6 into approximately 10 mil cup lids and then exposed to various environments. The cup lids containing 2% vanillin by IR analysis disintegrated very rapidly upon outdoor and accelerated exposure, but maintained their properties extremely well when exposed to sunlight through window glass, indicating an excelleni shelf-life.

Samples were exposed using different accelerated and outdoor exposure conditions as listed in Table VIII. Puncture strengths were determined and it was found that the puncture strengths were essentially nil at a carbonyl index of 2.1 and a hydroxyl index of 1.2 in all samples except the sample under glass. Similarly, it was found that in the accelerated tests and the direct outdoor exposures in Phoenix that the samples were essentially disintegrated when the carbonyl index reached 5.0 and the hydroxyl index reached 2.0. Using this information, the hours to reach these "states of degradation" were computed for the various test conditions. The correspondence of the hydroxyl and carbonyl indices are consistent, and both predict acceptable stability of products stored indoors.

TABLE VIII
HIGH IMPACT POLYSTYRENE/VANILLIN-2%
10 Mil Cup Lids

| | Exposure Hours To Reach | | | |
|---|---|---|---|---|
| | Puncture Failure | | Disintegration | |
| EXPOSURE METHOD | Hydroxyl Index of 1.2 | Carbonyl Index of 3.1 | Hydroxyl Index of 2.0 | Carbonyl Index of 5.0 |
| Emmaqua-Accelerated Sunshine | 125 | 125 | 225 | 215 |
| 45° South-Phoenix | 200 | 215 | 315 | 260 |
| Weather-o-meter | 225 | 230 | 375 | 370 |
| Boise-North on Ground | 730 | 780 | 1,210 | 1,260 |
| Boise-South under Glass | 1,650 | 1,870 | 2,760 | 2,980 |

EXAMPLE 11

Same as Example 1 but containing approximately 1% anthrone as photosensitizer rather than benzophenone. The resulting foam product was found to have greatly enhanced photodegradability relative to standard control samples.

EXAMPLE 12

Same as Example 1 but containing approximatey 1% anthraquinone as photosensitizer rather than benzophenone. The resulting foam product was found to have greatly enhanced photodegradability relative to standard control samples.

EXAMPLE 13

Same as Example 11 but containing approximately 3% anthrone as photosensitizer. This material was found to be much more rapidly photodegraded than the material from Example 11 containing 1% anthrone. Thus, the effective useful life of photosensitized plastic products can be changed as desired by adjusting the concentration of photosensitizers added to the system.

EXAMPLE 14

Same as Example 1, but containing approximately 1% o-chlorobenzaldehyde as photosensitizer. The resulting foam product exhibited enhanced degradation upon exposure to sunlight.

EXAMPLE 15

Same as Example 1, but containing approximately 1% 3,4-dihydroxybenzaldehyde as photosensitizer. The resulting foam product exhibited enhanced degradation upon exposure to sunlight.

EXAMPLE 16

Two percent 4,4'-di-t-butylbenzophenone (DTBBP) was physically mixed with Eastman low density polyethylene (LDPE) Tennite 154 DF and charged into the hopper of a ¾ inch extruder. The mixture was then extruded in the form of a rod that was pelletized. Similarly, a 5% mixture of iron stearate in LDPE was extruded and pelletized.

These materials were diluted with LDPE in appropriate ratio to form LDPE mixtures containing 0.1% DTBBP alone, 0.5% iron stearate alone, and a combination system of 0.1% DTBBP + 05% iron stearate. The mixtures were charged into the hopper of a 2½ inch extruder and film of 1½ mils thickness was blown and formed into trash can liner bags.

These bags were cut onto film samples, and subjected to accelerated light exposure. An aluminum foil-lined cabinet with eight GE RS sunlamps, four on two opposite sides at 8½ inches from the film samples, was used with a large volume cooling fan to maintain a temperature of 115° F in the chamber. Exposure test results using the accelerated exposure have been found to correlate well with outdoor direct sunlight exposure tests.

Samples were removed periodically from the exposure chamber to run infrared analyses on the films and to do physical testing of the films at various exposure times.

Infrared spectra of the films were taken, and absorbances of the 1710 cm$^{-1}$ carbonyl absorption and at the 1370 cm$^{-1}$ LDPE absorption were recorded. An increase in the 1710 cm$^{-1}$ absorption corresponds to the formation of carbonyl containing products of photo-oxidative degradation of the films. The carbonyl absorbance then was used as a measure of photo-degradation after normalizing by dividing by the absorbance of LDPE at 1370 cm$^{-1}$ at time zero to allow for variations in thickness of the films The "carbonyl index" is the absorbance ratio 1710 cm$^{-1}$ at time $t$ divided by 1370 cm$^{-1}$ at time zero. The greater this index, the greater the amount of photo-oxidation that has occurred.

The puncture strength of the films was measured as described in Example 3. Some of the data for the exposed samples of this example are shown in table IX.

TABLE IX

| SUNLAMP EXPOSURE | PUNCTURE INDEX | | CARBONYL INDEX | |
|---|---|---|---|---|
| Film Samples | 50 HR. | 100 HR. | 50 HR. | 100 HR. |
| LDPE Control | 1.11 | 0.81 | 0.24 | 0.43 |
| LOPE + 0.1% DTBBP | 1.18 | 0.65 | 0.30 | 0.48 |
| LDPE + 0.5% Iron Stearate | 1.10 | 0.47 | 0.33 | 0.69 |
| LDPE + 0.1% DTBBP + 0.5% Iron Stearate | 0.69 | 0.34 | 0.45 | 0.82 |

EXAMPLE 17

The concentrates described in Example 16, namely, 2% DTBBP and 5% iron stearate in LDPE, were diluted with LDPE in appropriate ratios to form LDPE mixtures containing 0.1% DTBBP and 0.5% iron stearate, Commercial color concentrates were added to some mixtures to include 5% of the color concentrate in the final mixture. LDPE mixtures containing green, blue, and brown pigments, each with 0.1% DTBBP and 0.5% iron stearate were extruded and blown into bags of 1½ mil wall thickness as in Example 16.

Samples from the bags were exposed and tested as in Example 16. The results are shown in the following Table X.

TABLE X

| | PUNCTURE INDEX | | CARBONYL INDEX | |
|---|---|---|---|---|
| | 50 HR | 100 HR | 50 HR | 100 HR |
| LDPE-Control | 1.11 | 0.81 | 0.24 | 0.43 |
| LDPE+Additive - Clear | 0.69 | 0.34 | 0.45 | 0.82 |
| LDPE+Additive - Green | 0.56 | 0.27 | 0.73 | 1.12 |
| LDPE+Additive - Blue | 0.39 | 0.20 | 0.72 | 1.23 |
| LDPE+Additive - Brown | <0.18 | — | >2.7 | — |

The data reveals that degradation is accelerated in all the samples containing additives relative to the control film. It is usually considered that pigments exert a screening effect and afford some protection from photo-degradation. But in the present example, the pigments accelerate the degradation of LDPE in the presence of the photosensitizing additives. This allows further control over the ratio of degradation.

The commercial color concentrates used in this example were Green No. 17161, Blue No. 16192 and Brown No. 18109 sold by Ampacet Corporation.

EXAMPLe 18

A set of LDPE film samples of about 1½ mils in thickness were produced by physically mixed dodecylbenzophenone (DBP) and anthraquinone (AQ) with LDPE both alone and in combination with iron stearate, and extruding film from a ¾ inch extruder. The films were exposed in an Atlas Sunshine Carbon Arc Weather-o-meter and samples withdrawn after different exposure periods for examination. Infrared spectra were taken and the carbonyl index described in Example 16 and the puncture index as described in Example 3 were also determined. Typical results are displayed in Table X1.

TABLE XI

| | PUNCTURE INDEX | | CARBONYL INDEX | |
|---|---|---|---|---|
| Exposure | 50 HR | 100 HR | 50 HR | 100 HR |
| LDPE + .1% DBP | 1.07 | 1.30 | 0.29 | 0.76 |
| LDPE + .1% Iron Stearate | 1.13 | 0.82 | 0.56 | 0.75 |
| LDPE + .1% DBP + .1% Iron Stearate | 1.00 | 0.61 | 0.63 | 1.22 |
| LDPE + .1% AQ + .1% Iron Stearate | 1.16 | 0.50 | 0.44 | 0.91 |
| LDPE Control | 1.44 | 0.85 | 0.19 | 0.47 |

Table XI reveals that the combinations of DBP + iron stearate, and AQ + iron stearate, are more effective in promoting degradation than any of the components alone.

EXAMPLE 19

Samples from the bags described in Example 17 containing brown pigment (iron oxide mixture) and 0.1% DTBBP and 0.5% iron stearate were exposed to G.E. RS sunlamp at a distance of 8 inches through a Corex glass filter for a period of 125 hours. Similarly, a control sample of LDPE, containing only brown pigment (iron oxide mixture) was exposed in the same manner.

These samples were subjected to gel permeation chromatography (GPO) to determine the extent of molecular degradation of the films. Average molecular weights were determined using a calibration curve established for branched polyethylene. The LDPE film samples were dissolved in trichlorobenzene and run on a five column set packed with Styragel at 145° C. The results of these measurements are presented in Table XH.

Reduced viscosities were also determined on solutions of LDPE in decalin at 130° C. Reduction in reduced viscosity upon exposure of the samples indicates a decrease in average molecular weight. For the control samples, the reduced viscosity was found to decrease by only 0.10 ml/g, while the reduced viscosity decreased by 1.47 ml/g for the amples containing photosensitizer upon exposure. This represents a large enhancement of degradation in the films containing photosensitizer.

TABLE XII

|  | Average Molecular Weight |
|---|---|
| Brown Control LDPE Film |  |
| —Unexposed | 10,000 |
| —Exposed | 2,800 |
| Brown LDPE Film with 0.1% DTBBP and 0.5% iron stearate |  |
| —Unexposed | 10,000 |
| —Exposed | 170 |

Table XII reveals that this sunlamp exposure leads to some degradation of control LDPE film containing brown color pigment, but a much more drastic reduction in molecular weight for the brown film containing DTBBP and iron stearate.

EXAMPLE 20

The susceptiblity of exposed LDPE to biodegration was investigated using a Princeton Aqua Science Aerobic Treatability Unit, Model EG-300. The instrument functions according to the principal that microbial utilization of organic material under aerobic conditions is directly related to the rate at which oxygen present in the reaction chamber is utilized. The rate of utilization of oxygen with time is measured using an electrode that measures dissolved oxygen.

LDPE samples used contained brown pigment (iron oxide mixture) and 0.1% DTBBP and 0.5% iron stearate. One sample was not exposed to light and one was exposed to a G.E. RS sunlamp at a distance of 8 inches through a Corex glass filter for a period of 125 hours.

800 ml. of bottom sludge water from a stagnant pond was charged into a one liter reaction vessel, and the temperature was maintained constant at 35° C.

The solution was aerated for 30 minutes to saturate the solution with oxygen, and then 20 mg. of dry yeast was added to the solution.

After turning off the aeration pump, the oxygen concentration was measured in the reaction solution continuously as a function of time. The oxygen concentration fell from an initial value of 8.8 ppm. oxygen to a constant value of 4.0 ppm. oxygen in a 4-hour period. The concentration then remained constant at 4.0 ppm. oxygen.

To this stabilized solution was then added 800 mg. of the unexposed film described above. The film was shredded up to facilitate its dispersion. It was found that the oxygen concentration was not changed and remained constant at 4.0 ppm. oxygen.

After the concentration had remained constant for 3 hours, 800 mg of shredded film that had been exposed to a sunlamp as described above was added to the solution. oxygen consumption begun immediately at the rate of 1.04 ppm. of oxygen per hour. This rate of oxygen consumption remained approximately constant over a 2½ hour period.

The oxygen consumption in the presence of the exposed material, but not in the presence of material of the same composition but not degraded by light, indicates biological activity and utilization of the degraded material by the micro-organisms.

While preferred embodiments and examples have been described, it will be apparent to those skilled in the art that various modifications may be made without deviating from the inventive concepts defined in the following claims.

We claim:

1. Microbially consumable packaging materials comprising a predominance of the photodegradation products of
   an aliphatic poly-α-olefin polymer;
   a photosensitizing agent selected from the group of compounds represented by the general formulas

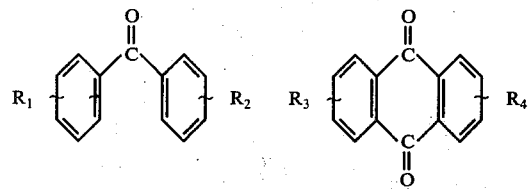

wherein $R_1$ and $R_3$ represent alkyl or alkoxyl groups containing at least four carbon atoms, and $R_2$ and $R_4$ represent hydrogen, halogen, alkyl or alkoxyl groups in the concentration range 0.01% to 0.5% by weight of the polymers;
   ferric stearate in the concentration range 0.01% to 0.5% by weight of the polymers;
   a color pigment that accelerates sensitized photodegradation in a concentration of about five percent by weight of the polymer;
   oxygen; and
   sunlight.

2. A method of degrading an article of manufacture containing as constituents the mixture of claim 1 into a microbially consumable intermediate product, which comprises the step of exposing said article to radiation within the spectrum of the ultraviolet content of sunlight in the presence of oxygen under ambient pressure and temperature for a period in excess of fifty hours sufficient to initiate molecular degradation of said polymer.

3. The microbially consumable packaging material of claim 1 wherein the color pigment is taken from the group consisting of Ampacet green No. 17161, Ampacet blue No. 16192 and Ampacet brown No. 18109.

4. Microbially consumable packaging material made by exposure to radiation within the spectrum of the ultraviolet content of sunlight under ambient pressure and temperature for a period in excess of fifty hours and comprising a predominance of the photodegradation products of
   an aliphatic poly-α-olefin polymer;
   a photosensitizing agent selected from the group of compounds represented by the general formulas

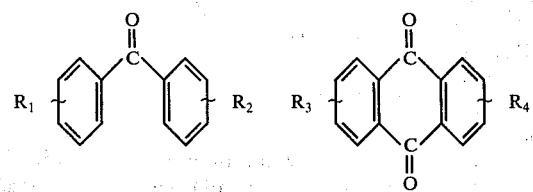

wherein $R_1$ and $R_3$ represent alkyl or alkoxyl groups containing at least four carbon atoms, and $R_2$ and $R_4$ represent hydrogen, halogen, alkyl or alkoxyl and groups in the concentration range 0.01% to 0.5% by weight of the polymer;

ferric stearate in the concentration range 0.01% to 0.5% by weight of the polymer.

a color pigment that accelerates sensitized photodegradation in a concentration of about five percent by weight of the polymer; and oxygen.

5. The microbially consumable packaging material of claim 4 wherein the color pigment is taken from the group consisting of Ampacet green No. 17161, Ampacet blue No. 16192 and Ampacet brown No. 18109.

6. Disposable plastic products fabricated from polymeric material photodegradable upon disposal by exposure to radiation within the spectrum of the ultraviolet content of sunlight in an atmospheric environment comprising a mixture of an aliphatic poly-α-olefin polymer;

a photosensitizing agent selected from the group of compounds represented by the general formulas

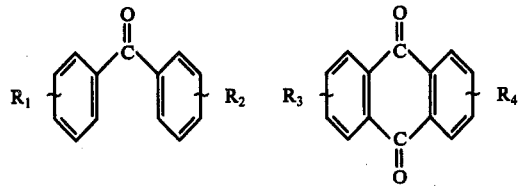

wherein $R_1$ and $R_3$ represent alkyl or alkoxyl groups containing at least four carbon atoms, and $R_2$ and $R_4$ represent hydrogen, halogen, alkyl or alkoxyl groups in the concentration range 0.01% to 0.05% by weight of the polymers;

ferric stearate in the concentration range 0.01% to 0.05% by weight of the polymer; and a color pigment tht accelerates sensitized photodegradation in a concentration of about five percent by weight of the polymer.

7. Disposable plastic products a defined in claim 6 wherein the polymer is polyethylene.

8. Disposable plastic products as defined in claim 6 wherein photosensitizing agent is selected from group consisting of 4, 4-di-t-butylbenzophenone, 4-dodecylbenzophenone, and 2-t-butylanthraquinone.

9. Plastic products as defined in claim 6 wherein the color pigment is taken from the group consisting of Ampacet green No. 17161, Ampacet blue No. 16192 and Ampacet brown No. 18109.

* * * * *

UNITED STATES PATENT AND TRADEMARK OFFICE
CERTIFICATE OF CORRECTION

PATENT NO. : 4,038,227
DATED : July 26, 1977
INVENTOR(S) : Swanholm et al

It is certified that error appears in the above-identified patent and that said Letters Patent are hereby corrected as shown below:

Col. 2, line 50, "indication" should be "induction"

Col. 7, line 16, "biiologically" should be "biologically"

Col. 8, line 56, "prepaared" should be "prepared"

Col. 8, line 62, "procss" should be "process"

Col. 11, line 11, "cused" should be "caused"

Col. 11, line 24, "plystyrene" should be "polystyrene"

Col. 11, line 31, "excelleni" should be "excellent"

Col. 15, line 5, "amples" should be "samples"

UNITED STATES PATENT AND TRADEMARK OFFICE
CERTIFICATE OF CORRECTION

PATENT NO. : 4,038,227
DATED : July 26, 1977
INVENTOR(S) : Swanholm et al

It is certified that error appears in the above-identified patent and that said Letters Patent are hereby corrected as shown below:

col. 15, line 26 "susceptiblity" should be "susceptibility"

col. 18, line 13, "0.05%" should be "0.5%"

Signed and Sealed this

Sixth Day of December 1977

[SEAL]

Attest:

RUTH C. MASON
Attesting Officer

LUTRELLE F. PARKER
Acting Commissioner of Patents and Trademarks